United States Patent

Winklhofer et al.

Patent Number: 5,864,392
Date of Patent: Jan. 26, 1999

[54] METHOD FOR OPTICALLY DETECTING GAS BUBBLES MOVING IN A COOLANT

[75] Inventors: Ernst Winklhofer, Johann ob Hohenburg; Harald Arnulf Philipp, Wegersfeld; Horst Tschetsch, Graz, all of Austria

[73] Assignee: AVL List GmbH, Graz, Austria

[21] Appl. No.: 764,128

[22] Filed: Dec. 12, 1996

[30] Foreign Application Priority Data

Dec. 15, 1995 [AT] Austria ............................. GM 684/95

[51] Int. Cl.⁶ ............................. G01P 3/36; G01F 1/708
[52] U.S. Cl. .......................................... 356/28; 73/861.05
[58] Field of Search .................. 356/28, 28.5; 73/861.05

[56] References Cited

U.S. PATENT DOCUMENTS

| | | | |
|---|---|---|---|
| 3,867,033 | 2/1975 | Hasinger | 356/103 |
| 4,659,218 | 4/1987 | De Lasa et al. | 356/133 |
| 4,856,895 | 8/1989 | Parker | 356/28 |
| 4,978,863 | 12/1990 | Lyons et al. | 250/574 |
| 5,033,858 | 7/1991 | Twerdochlib et al. | |
| 5,170,060 | 12/1992 | Maillard et al. | 250/560 |

FOREIGN PATENT DOCUMENTS

| | | |
|---|---|---|
| 8223582 | 10/1982 | Australia . |
| 0184269 | 6/1986 | European Pat. Off. . |
| 0289833 | 11/1988 | European Pat. Off. . |
| 1373813 | 11/1974 | United Kingdom . |
| 2248927 | 4/1992 | United Kingdom . |

*Primary Examiner*—Stephen C. Buczinski
*Attorney, Agent, or Firm*—Watson Cole Grindle Watson, P.L.L.C.

[57] ABSTRACT

For optical detection of the velocity of gas bubbles in the cooling liquid of an internal combustion engine, light is radiated into the coolant by means of at least one emitter, and the scattered light caused by the gas bubbles, or rather, the change in intensity of light radiation emitted into the coolant, is measured by an optical sensor. The scattered light or intensity change is measured in at least two adjacent areas, and the velocity of the bubbles is determined from the travel time between the measurement signals.

3 Claims, 2 Drawing Sheets

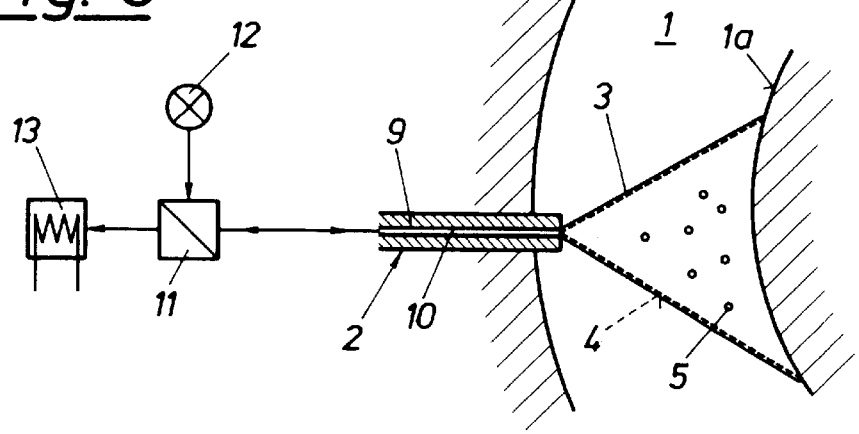
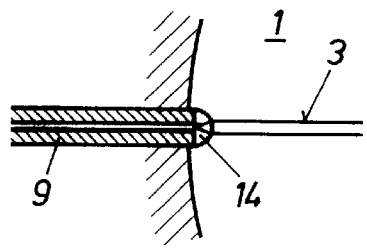
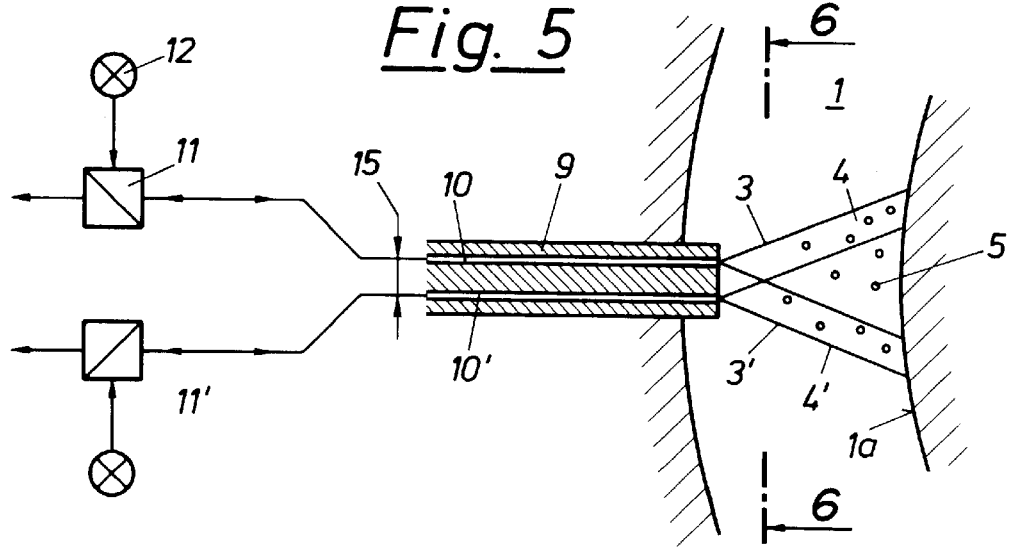

METHOD FOR OPTICALLY DETECTING GAS BUBBLES MOVING IN A COOLANT

BACKGROUND OF THE INVENTION

The present invention relates to a method for optically detecting gas bubbles in the cooling liquid of an internal combustion engine, where light is radiated into the coolant via at least one emitter and the scattered light caused by the presence of the gas bubbles, or rather, the change in intensity of light radiation emitted into the coolant, is measured by a sensor, and to a device for implementing this method.

The size, number and velocity of gas bubbles in the coolant of an internal combustion engine have an essential influence on the performance of the cooling system.

DESCRIPTION OF THE PRIOR ART

For optical detection of gas bubbles in liquids various devices and methods are known. EP 0 289 833 A2, for example, presents a method and device in which light is radially directed into a tube by means of a light source. The axis of the light sensor is positioned at an angle relative to the axis of the irradiated light, such that the light sensor will detect scattered light only in the presence of air bubbles. A similar apparatus is presented in GB 2 248 927 A. These known devices are only suited for the simple detection of bubbles, however, without the option of measuring bubble velocity.

SUMMARY OF THE INVENTION

It is an object of the present invention to provide a measuring device and method for measuring the velocity of gas bubbles in cooling liquids.

In the invention this object is achieved by measuring the amount of scattered light or the intensity change in at least two adjacent areas, and by determining bubble velocity from the travel time between the measuring signals. It is provided for this purpose that two or more optical waveguides for measuring the signals of the scattered light enter the coolant channel at a distance of each other via at least one probe.

It is provided in a preferred embodiment of the invention that the two or more optical waveguides for measuring the signals of the scattered light or change in intensity be arranged in a single probe.

According to a variant of the invention the light is emitted by at least one probe introduced into the coolant channel. Emission and measuring probe may differ or be identical in this instance.

If the light is provided by an external light source inside a measuring probe, light emission and detection may be effected by means of a single waveguide in which a beam splitter is provided. Both the entrance of light and the exit of the detected light scatter are effected via one and the same optical fiber.

It may further be provided that a two-armed waveguide be used instead of a single optical fiber and a beam splitter.

In a particularly advantageous variant of the invention the scattered light of background radiation in the infrared range is measured. The background radiation in the infrared range is provided by the walls of the coolant channel exhibiting engine operating temperature. In this way the heat radiation of the internal combustion engine is utilized and no external light source is required.

BRIEF DESCRIPTION OF THE DRAWINGS

The invention will now be further described with reference to the accompanying drawings, in which FIGS. 2 to 5 are further variants of the invention with a combined emitter-sensor probe, and FIG. 6 is a view of a probe is seen along line 6—6 in FIG. 5.

DETAILED DESCRIPTION OF PREFERRED EMBODIMENTS

Figure 1:
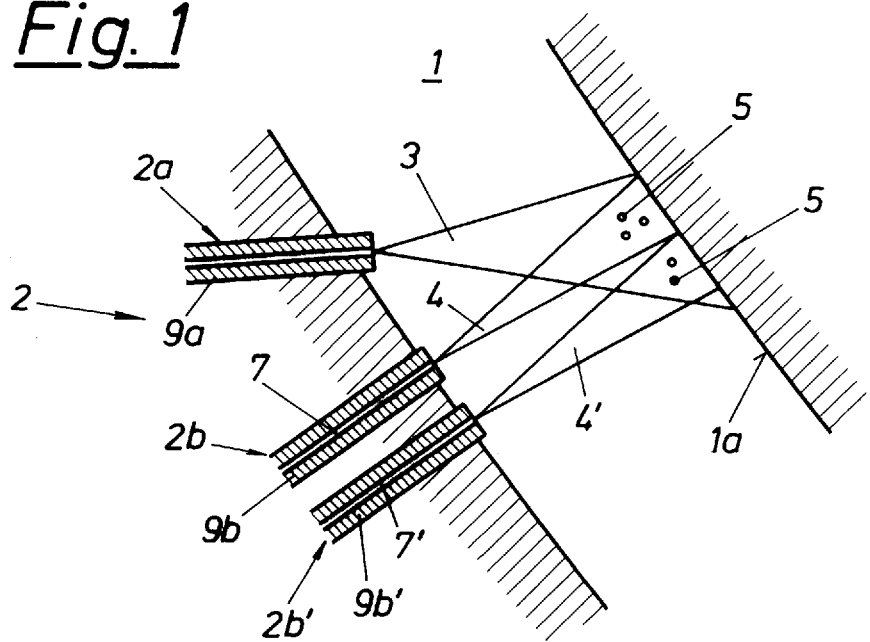
FIG. 1 shows a device according to the present invention with a light-emitting probe and a sensing probe introduced into a coolant channel.

In the embodiment shown in FIG. 1 the measuring device 2, comprising an emitter 2a and a sensor 2b and 2b', enters a coolant channel 1, emitter 2a and sensors 2b, 2b' being constituted by separate probes 9a, 9b, 9b' positioned at a distance of each other. The light cone radiated into the coolant channel 1 has the reference number 3. Sensors 2b, 2b' are located in such a way that the measuring cone 4, 4' overlaps the light cone 3, receiving the scattered light caused by the gas bubbles 5. The scattered light is a measure for the size and number of gas bubbles.

For measuring bubble velocity the travel time between certain bubbles 5 or groups of bubbles is determined. For this purpose at least two optical fibers 7, 7', or 10, 10' are used, which are located at a distance 15 from each other, the fibers being placed in separate probes 9b, 9b' according to FIG. 1, or, as shown in FIG. 5, integrated in one probe 9. From the time delay between the signals of the scattered light from the first fiber 10 and the second fiber 10' and the distance 15, the velocity of the bubbles is determined. If desired, the external light source may be eliminated by configuring sensor 2b as an infrared sensor and using the channel walls 1a of the coolant channels 1 as emitters, thus employing the waste heat of the engine as radiation source. In this instance the intensity change of the background radiation or the scattered light of the infrared radiation caused by the bubbles can be used as a measuring signal.

Figure 2:
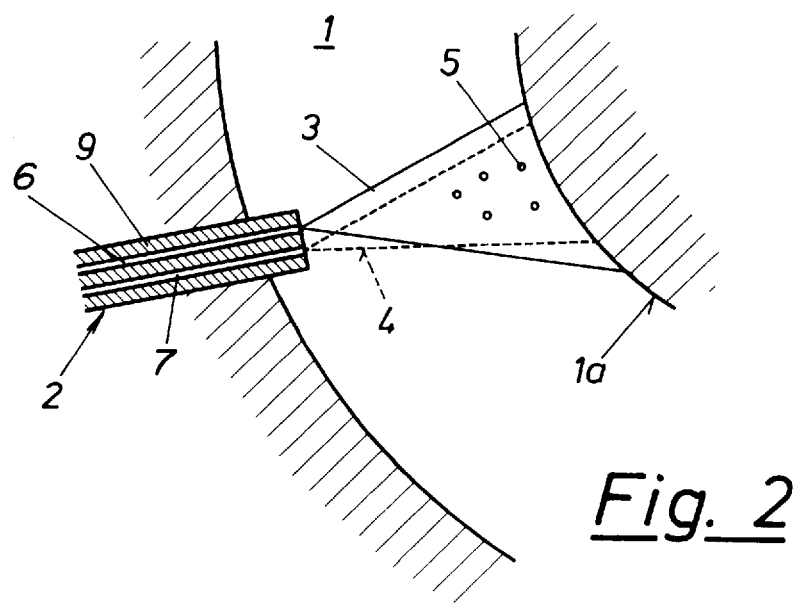

As is shown in FIG. 2, the optical fibers 6 and 7 of the emitter and the sensor may be placed in a single probe 9, the axes of the light cone 3 and the measuring cone 4 being arranged approximately parallel to each other. To measure velocity two probes 9 are required, which are located at a distance from each other in the direction of flow.

A further simplified variant of the device 2 is shown in FIG. 3. In this case probe 9 is provided with a single optical waveguide, for instance, a single fiber 10. Via a beam splitter 11 light is transmitted from a light source 12 into the waveguide 10, while measuring light is conducted from the waveguide 10 to a photosensor 13, such as a photodiode or photomultiplier.

To define the measuring area a front lens 14 may be provided at the entrance of the probe 9 into the coolant channel 1, as is shown in FIG. 4.

Instead of a single fiber 10 and a beam splitter 11 a two-armed waveguide could be used.

Referring to FIG. 6, it may be found useful for practical purposes to provide four fibers in a four-channel sensor, and to use cross-correlation in processing the signal for determination of the time delay.

We claim:

1. A method for optically detecting gas bubbles in a coolant of a coolant channel of an internal combustion engine, comprising:

emitting infrared radiation into the coolant from a wall of the coolant channel, measuring scattered infrared radiation caused by the presence of the gas bubbles in the coolant by sensors located in at least two adjacent areas, and determining bubble velocity from a travel time between measuring signals.

2. A device for optically detecting gas bubbles in a coolant of a coolant channel of an internal combustion engine, said coolant channel having a wall which emits infrared radiation, comprising:

at least one optical sensor connected to an evaluation unit, at least one probe in communication with said coolant channel, and at least two separated optical waveguides for measuring signals of scattered infrared radiation caused by the presence of the gas bubbles or of change in intensity of infrared radiation emitted into the coolant, at least one of said two optical waveguides entering the coolant channel through said at least one probe.

3. A device as defined in claim 2 wherein said at least two optical waveguides for measuring the signals are arranged in a single probe.

* * * * *